United States Patent
Brandl et al.

(10) Patent No.: US 7,929,265 B2
(45) Date of Patent: Apr. 19, 2011

(54) RADIO FREQUENCY INTERFACE CIRCUIT FOR A RADIO FREQUENCY IDENTIFICATION TAG

(75) Inventors: Roland Brandl, Eggersdorf Bei Graz (AT); Ewald Bergler, Weiz (AT); Robert Spindler, Graz (AT)

(73) Assignee: NXP B.V., Eindhoven (NL)

( * ) Notice: Subject to any disclaimer, the term of this patent is extended or adjusted under 35 U.S.C. 154(b) by 141 days.

(21) Appl. No.: 12/097,599

(22) PCT Filed: Dec. 14, 2006

(86) PCT No.: PCT/IB2006/054835
§ 371 (c)(1),
(2), (4) Date: Jun. 16, 2008

(87) PCT Pub. No.: WO2007/069211
PCT Pub. Date: Jun. 21, 2007

(65) Prior Publication Data
US 2008/0266729 A1    Oct. 30, 2008

(30) Foreign Application Priority Data

Dec. 15, 2005   (EP) .................................... 05112213

(51) Int. Cl.
*H02H 9/00* (2006.01)
(52) U.S. Cl. ........................................................ 361/56
(58) Field of Classification Search .................... 361/56; 327/536; 340/10.1; 235/492
See application file for complete search history.

(56) References Cited

U.S. PATENT DOCUMENTS

| 5,815,355 A * | 9/1998 | Dawes ............................ 361/56 |
| 2006/0132221 A1* | 6/2006 | Pardoen ........................ 327/536 |

FOREIGN PATENT DOCUMENTS

| DE | 10357 A1 | 7/2004 |
| EP | 1672563 A1 | 6/2006 |
| WO | 9638805 A2 | 12/1996 |
| WO | 2003105227 A2 | 12/2003 |

OTHER PUBLICATIONS

Gossner, Harald "ESD Protection for the Deep Sub Micron Regime- A Challenge for Design Methodology" 17th International Conference on VLSI Design, 2004, pp. 809-818.

* cited by examiner

*Primary Examiner* — Jared J Fureman
*Assistant Examiner* — Angela Brooks

(57) ABSTRACT

A radio frequency interface circuit (11) for a radio frequency identification tag comprising—at least two input terminals (RF+, RF−) for connecting the circuit (10) with an antenna structure of the radio frequency identification tag, —one or more variable resistive loads (14) coupled across pairs of the input terminals (RF+, RF−)—one or more rectifiers (15) each connected on its input side to a pair of input terminals (RF+, RF−) and on its output side to a parallel connection of voltage control means (16) and modulation control means (17), wherein combiner means (18) are provided which are adapted to receive an output signal (19, 20) from the voltage control means (16) and the modulation control means (17), respectively, and to generate a control signal (21) for controlling each variable resistive load (14) depending on the received signals (19, 20) in such a way that each variable resistive load (14) serves as a modulation and voltage regulation circuit, and wherein each variable resistive load is adapted to serve as an electro static discharge protection circuit.

8 Claims, 2 Drawing Sheets

RADIO FREQUENCY INTERFACE CIRCUIT FOR A RADIO FREQUENCY IDENTIFICATION TAG

FIELD OF THE INVENTION

The invention relates to a radio frequency interface circuit for a radio frequency identification tag.

BACKGROUND OF THE INVENTION

A radio frequency identification (RFID) tag usually comprises ESD (electro static discharge) structures on its antenna terminals in order to avoid over voltage conditions which could damage an integrated circuit (IC) of the RFID tag. The ESD structure is a voltage clamp which limits the voltage between two terminals to a predefined maximum voltage. For example, such a voltage clamp comprises diode structures which short-circuit two terminals if the voltage between the two terminals exceeds a predefined maximum voltage. Thus, electric current flows over the diode structures from one terminal to the other terminal avoiding a damage of the IC due to a high current or voltage.

FIG. 4 shows a typical radio frequency interface circuit for a RFID tag in detail. An ESD structure 22 serves as a voltage clamp and couples two input terminals RF+ and RF- for connecting the shown circuit with an antenna structure (not shown) of the RFID tag. If the voltage between the two terminals RF+ and RF- exceeds a predefined clamp voltage, the ESD structure 22 conducts such that electric current flows from terminal RF+ to RF- or vice versa. A rectifier 15 connected on its input side to the two terminals RF+ and RF- is protected by the ESD structure 22 from high electrostatic discharging voltages. A limiting transistor 23 and a modulation transistor 24 are connected in parallel to the outputs of the rectifier 15 and serve as modulation and voltage regulation circuit, respectively. The limiting transistor 23 is controlled by voltage control means 16 which are supplied by the rectifier 15. The modulation transistor 24 is controlled by modulation control means 17 which are also supplied by the rectifier 15. This known circuitry has the drawback that the ESD structures usually applied for such circuitry has a large parasitic capacitance. A further drawback is that the rectifier 15 must be designed to deliver a high current for the limiting transistor 23.

U.S. Pat. No. 5,815,355 discloses a modulation compensated clamp circuit for a RFID tag which comprises a shunt transistor connected between two input terminals for connecting with an antenna of the RFID tag. A further load transistor is connected in parallel to the shunt transistor between the two terminals and used to vary the Q factor of a tank circuit depending on data read from a memory. Both transistors are placed before a rectifier for supplying the electronic circuitry of the RFID tag with electric power. However, the two transistors connected in parallel between both input terminals still cause a high input capacitance which is not desired since it degrades the radio frequency performance. Particularly in the UHF (ultra high frequency) band, which is often used for RFID transponder, a low input capacitance plays a significant role in order to detect also low signals from a RFID reader.

OBJECT AND SUMMARY OF THE INVENTION

It is an object of the invention to provide a radio frequency interface circuit for a radio frequency identification tag which comprises an over voltage or ESD protection and has a lower input capacitance than the above mentioned circuits.

In order to achieve the object defined above, with a radio frequency interface circuit for a radio frequency identification tag according to the invention characteristic features are provided so that a circuit according to the invention can be characterized in the way defined below, that is:

at least two input terminals for connecting the circuit with an antenna structure of the radio frequency identification tag, one or more variable resistive loads coupled across pairs of the input terminals, one or more rectifiers each connected on its input side to a pair of input terminals and on its output side to a parallel connection of voltage control means and modulation control means, wherein combiner means are provided which are adapted to receive an output signal from the voltage control means and the modulation control means, respectively, and to generate a control signal for controlling each variable resistive load depending on the received signals in such a way that each variable resistive load serves as a modulation and voltage regulation circuit, and wherein each variable resistive load is adapted to serve as an electro static discharge protection circuit.

The characteristic features according to the invention provide the advantage that several functions such as modulation, voltage regulation and electro static discharge protection are combined in one variable resistive load. This allows to implement the circuit according to the invention at lower costs than the circuits discussed in the introductory part. Finally, the circuit according to the invention has a relatively low input capacity since merely the variable resistive load and the rectifier connected in parallel to the antenna form this capacitance. Thus, with the circuit according to the invention, a high radio frequency performance particularly in the UHF range around 800 MHz may be achieved. Furthermore, the rectifier may be designed for lower currents since the voltage limiting structures are placed before the rectifier. This also may support a reduction of the input capacitance of the circuit.

The combiner means may be adapted to detect an over voltage condition from the output signal received from the voltage control means and to generate the control signal such that each variable resistive load is set to a value limiting the input voltage of each rectifier.

The combiner means may further be adapted to modulate the control signal in accordance with the output signal received from the modulation control means such that the resistance of each variable resistive load is modulated for transmitting data over the antenna structure of the radio frequency identification tag.

In order to achieve a high radio frequency performance, the circuit may be adapted to be operated in the UHF range of about 800 MHz. However, it should be noted that the circuit may also be operated in a frequency range up to about 2.5 GHz.

Preferably, a variable resistive load is a MOSFET, coupled across a pair of input terminals (RF+, RF-), wherein the control signal is coupled to the gate of the MOSFET.

The MOSFET should be designed to clamp typical electrostatic discharging voltages. For example, it may be designed similar to a NFET such as it is described in the publication "ESD protection for the deep sub micron regime—a challenge for design methodology", H. Gossner, Proceedings of the 17$^{th}$ International Conference on VLSI Design (VLSID'04), 2004 IEEE.

According to a further aspect, the invention relates to an integrated circuit for a frequency identification tag comprising a radio frequency interface circuit as described above.

According to a further aspect, the invention relates to a radio frequency identification tag comprising a radio frequency interface circuit as described above.

The aspects defined above and further aspects of the invention are apparent from the exemplary embodiments to be described hereinafter and are explained with reference to these exemplary embodiments.

BRIEF DESCRIPTION OF THE DRAWINGS

The invention will be described in more detail hereinafter with reference to exemplary embodiments. However, the invention is not limited to these exemplary embodiments.

DESCRIPTION OF EMBODIMENTS

Figure 4:
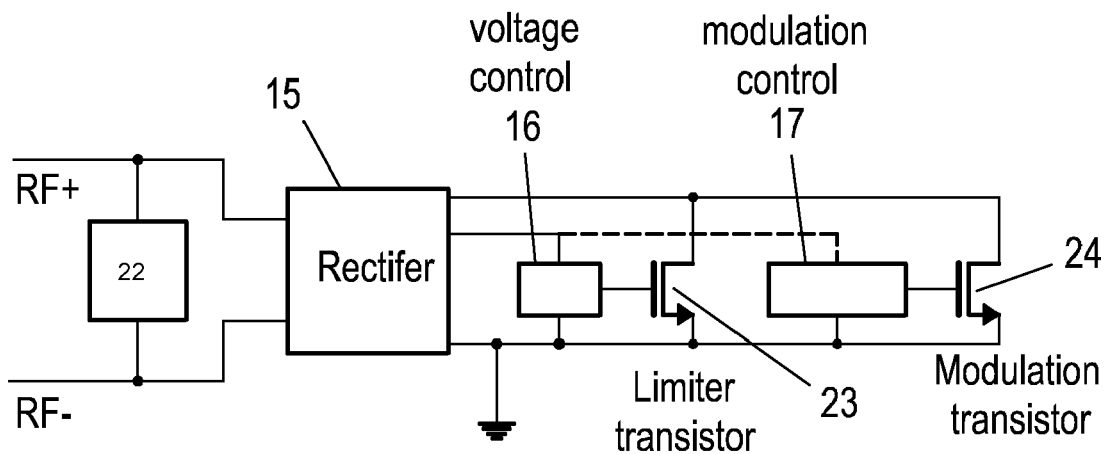
FIG. 4 shows a radio frequency interface circuit for a RFID tag according to prior art.

Identical, similar, and functional identical or similar elements can be denoted with the same reference numerals in the following description. For the description of FIG. 4 refer to the introductory part of this description.

Figure 1:
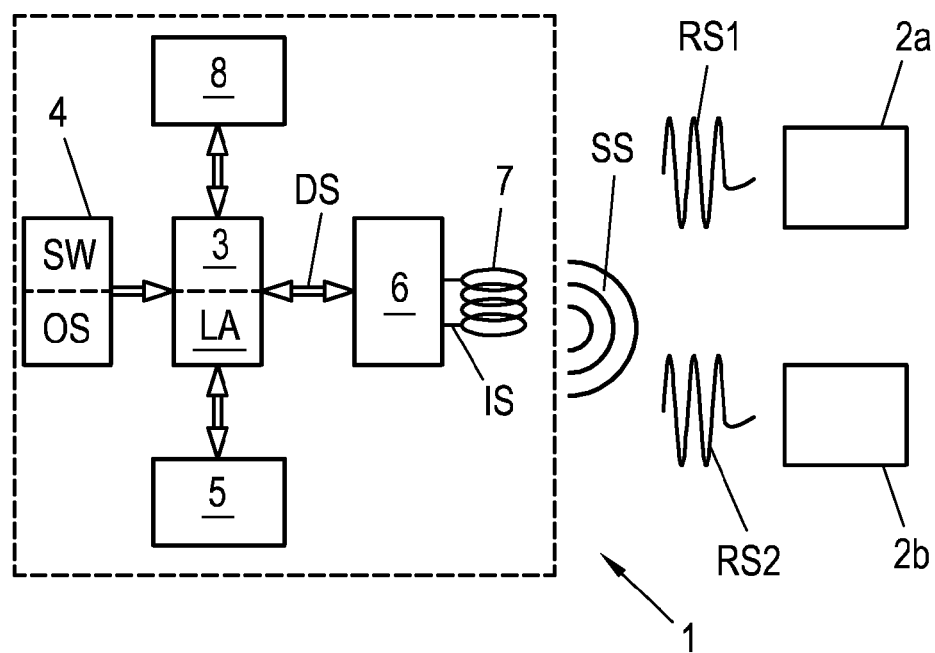
FIG. 1 shows a schematic block circuit diagram of a RFID system.

FIG. 1 shows a schematic block circuit diagram of an RFID system comprising an RFID reader 1 and a number of RFID tags 2a, 2b, wherein, for the sake of clearness, only two RFID tags are depicted. RFID reader 1 communicates with the RFID tags 2a, 2b in a contact-less manner via modulated electromagnetic signals, provided the RFID tags 2a, 2b are within the transmission and receiving range of the RFID reader 1. The RFID reader 1 comprises control means 3, like a microprocessor or micro-controller, which control means 3 communicate via a data bus with program storage means 4. The program storage means 4 is adapted to store an operating system OS for basic operation of the control means 3 and application program code SW to be processed by the control means 3. In one embodiment the program storage means 4 may be configured as a non-volatile memory, like a PROM, EPROM, EEPROM or the like. In another embodiment the program storage means 4 may be configured as a user definable ASIC, PAL or the like. Further, the control means 3 and the program storage means 4 may be integrated into a single chip. It should be observed that the application program code SW and the operating system OS may be integrated. The control means 3 further communicate with a random access memory 5. The control means 3, when processing the program code SW, cooperate with input/output means 8, which e.g. can be configured as a link interface to a computer. The control means 3 further communicate with radio frequency communication means 6 which are connected to an antenna 7 for transmitting electromagnetic signals SS to the RFID tags 2a, 2b. These electromagnetic signals SS may be used for both transmitting data to the RFID tags 2a, 2b and energizing the RFID tags 2a, 2b if they are configured as passive tags. The RFID tags 2a, 2b respond to the RFID reader with response signals RS1, RS2. Data exchange between the RFID reader 1 and the RFID tags 2a, 2b may be accomplished by standard data transmission protocols and standard modulation methods. For instance, the electromagnetic signal SS sent from the RFID reader 1 to the RFID tags 2a, 2b is configured as a pulse-width modulated signal. The response signals RS1, RS2 from the RFID tags 2a, 2b to the RFID reader are e.g. load modulated signals, wherein a carrier signal or subcarrier signal contained in the electromagnetic signal SS is modulated by switching a load impedance connected to the antennas of the RFID tags 2a, 2b, so that varying energy is drawn from the carrier signal or subcarrier signal. Switching the load impedances at the RFID tags causes a change of the impedance of the antenna 7 of the RFID reader 1 and hence a varying amplitude of the voltage at the antenna 7 of the RFID reader 1, which varying voltage amplitude represents an input signal IS to the radio frequency communication means 6. For recovery of data contained in the input signal IS the input signal IS is rectified or demodulated by radio frequency communication means 6, yielding data stream signal DS. The control means 3 extract the data coded in the data stream signal DS, e.g. by comparing it with defined bit levels.

Figure 2:
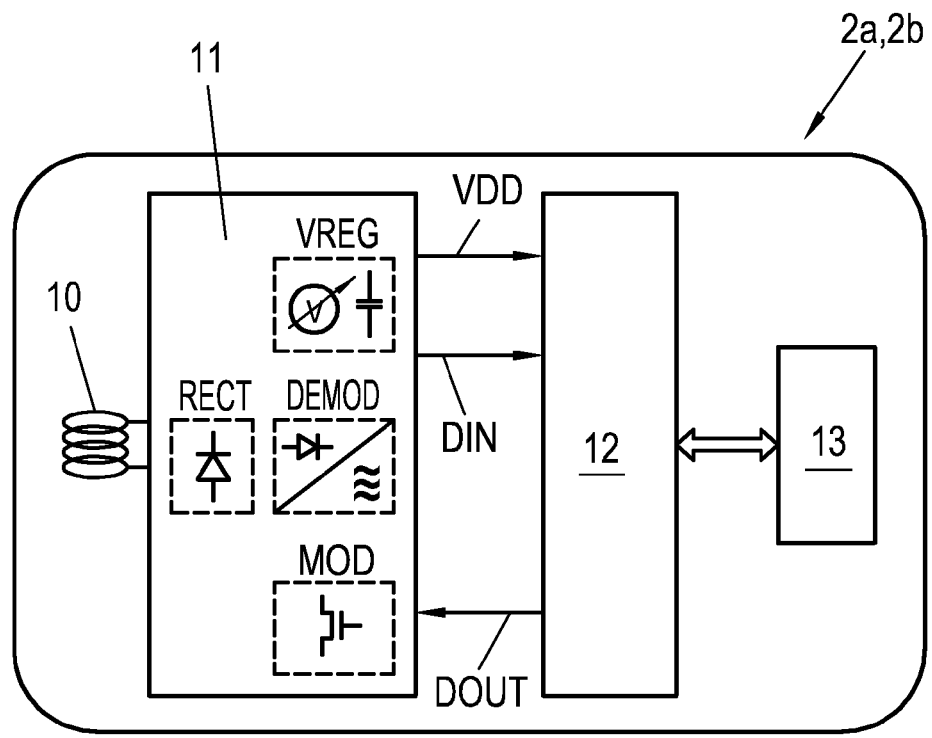
FIG. 2 shows a schematic block circuit diagram of a RFID tag.

FIG. 2 shows a schematic block circuit diagram of an exemplary embodiment of the RFID tags 2a, 2b. Each RFID tag 2a, 2b is configured as a passive tag and comprises an antenna 10, an analogue radio frequency interface 11 that is connected to the antenna 10, a digital control unit 12 that is connected to the analogue radio frequency interface 11, and a memory 13 that is connected to the digital control unit 12. The memory 13 is a non-volatile memory, like an EEPROM, so that data that are written into the memory 13 during communication with the RFID reader 1 remain stored even when the RFID tag 2a, 2b is switched off, e.g. because it leaves the transmitting range of the RFID reader 1 and is therefore not longer energized by the RFID reader 1. Memory 13 may also contain program code for operating the digital control unit 12 and a unique identification number. Antenna 10 receives the electromagnetic signals SS from the RFID reader 1 and passes them to the analogue radio frequency interface 11. In general, the analogue radio frequency interface 11 comprises a rectifier RECT and a voltage regulator VREG with integrated energy storage element, like a capacitor, to derive from the received electromagnetic signals SS the necessary operating voltage VDD for the digital control unit 12 and the memory 13. Further, analogue radio frequency interface 11 comprises a demodulator DEMOD to extract data DIN from the electromagnetic signals SS and to pass them to the digital control unit 12. Digital control unit 12 processes the received data DIN and may respond to the RFID reader 1 by creating output data DOUT and passing them to the analogue radio frequency interface 11. Analogue radio frequency interface 11 comprises a modulator MOD that modulates the output data DOUT and transmits the modulated signals as response signals RS1, RS2 via antenna 10.

Figure 3:
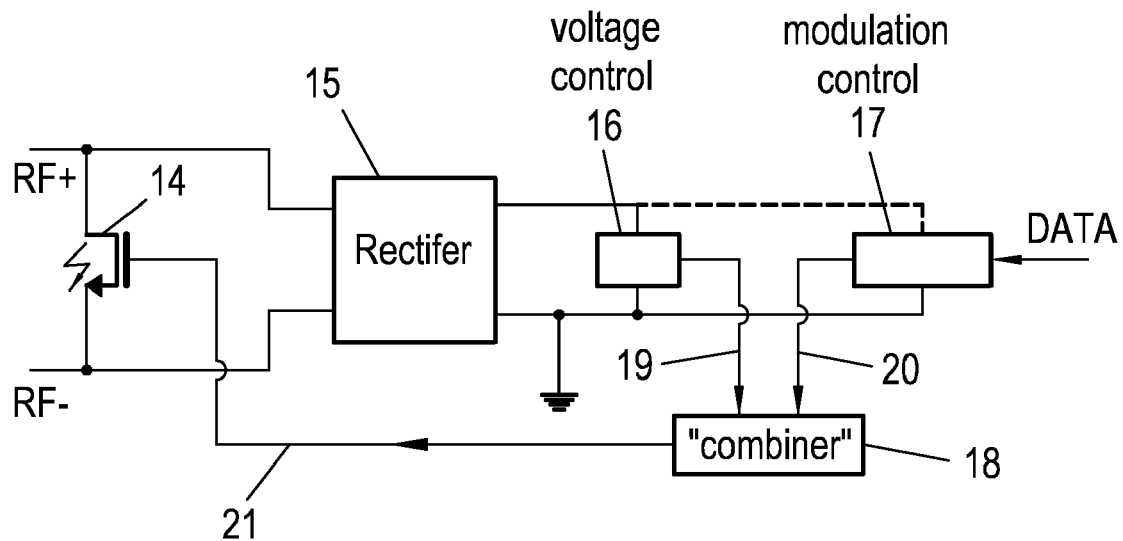
FIG. 3 shows a first embodiment of a radio frequency interface circuit for a RFID tag according to the invention.

FIG. 3 shows an embodiment of the analogue radio frequency interface circuit 11 according to the invention. The circuit 11 comprises two input terminal RF+ and RF− for connecting with an antenna (not shown) of the RFID tag, such as the antenna 10 of FIG. 2. Electromagnetic signals received by the antenna are passed to a rectifier 15 which rectifies the alternating current into an direct current which is supplied to voltage control means 16 and modulation control means 17 connected in parallel with the output side of the rectifier 15. In order to achieve a stable and defined operating voltage VDD as necessary for supplying the electronic circuits of the RFID tag such as the digital control unit 12 and the memory 13 (as shown in FIG. 2), the voltage regulation means 16 measure the output voltage of the rectifier 15 and compare it with a reference voltage. In case of deviations of the rectifier output voltage from the reference voltage, the voltage control means 16 generate an output signal 19 which is supplied to combiner means 18 for further processing. Also, the modulation control means 17 generate an output signal 20 depending on data DATA, for example received from the digital control unit 12. The data may be the output data DOUT read out from the memory 13 by the digital control unit 12. The output signal 20 generated by the modulation control means 17 is also supplied to the combiner means 18 for further processing.

In one embodiment a summing circuit designed for summing the received output signals 19 and 20 may implement the combiner means 18. In another embodiment a more complex circuit being designed for processing the received output signals 19 and 20 according to a certain algorithm may realize the combiner means 18. The combiner means 18 generate a control signal 21 for controlling a variable resistive load coupling the two terminals RF+ and RF−. The variable resistive load may be implemented by a transistor such as a MOSFET 14 as shown in FIG. 3. The combination of the variable resistive load implemented by the MOSFET 14 and the combiner means 18 serves as a modulation, voltage regulation and electro static discharge protection circuit. In order to accomplish these tasks, the combiner means 18 control the MOSFET 14 via the control signal 21 as explained in the following.

If an over voltage condition occurs at the terminals RF+ and RF−, for example due to an electrostatic discharging voltage, the conductivity of the variable resistive load of the MOSFET 14 between the terminals RF+ and RF− is decreased due to the overvoltage and an electric current generated by the electrostatic discharging voltage flows over the variable resistive load of the MOSFET 14 from terminal RF+ to terminal RF− or vice versa. In this case, the MOSFET 14 serves as electro static discharge protection circuit which clamps overvoltages on the terminals RF+ and RF−.

A further functionality of the combiner means 18 is the voltage regulation and limitation in combination with the voltage control means 16. If the voltage control means 16 detect a deviation of the output voltage of the rectifier 15 from the reference voltage, for example due to high filed strength of the electromagnetic signals received via the antenna of the RFID tag, they generate an output signal 19 indicating this rectifier output voltage deviation to the combiner means 18. The combiner means 18 control the MOSFET 14 in that they regulate the input voltage of the rectifier 15 via regulation of the variable resistive load of the MOSFET 14 between the terminals RF+ and RF− in such a way that the rectifier output voltage approximates the reference voltage. Thus, input voltage fluctuations of the rectifier may be regulated by controlling input voltage of the rectifier 15 via the variable resistive load of the MOSFET 14. In this case, the MOSFET 14 under the control of the combiner means 18 serves as voltage regulation and limitation circuit.

Finally, the combiner means 18 in combination with MOSFET 14 serve as modulation circuit. The modulation control means 17 receive a DATA signal containing data which may be read out from the memory 13 by the digital control unit 12 and which should be transferred over the radio frequency interface of the RFID tag. The data are sent out as load modulated signals, wherein a carrier signal or subcarrier signal contained in the electromagnetic signal is modulated by switching the MOSFET 14, which forms a load impedance connected to the antenna of the RFID tag. The MOSFET 14 is switched under control of the control signal 21 generated by the combiner means 18 corresponding to the data contained in the DATA signal. Thus, varying energy is drawn from the carrier signal or subcarrier signal. Switching the MOSFET 14 causes a change of the impedance of the antenna of a RFID reader and hence a varying amplitude of the voltage at the antenna of the RFID reader. This varying voltage amplitude represents an input signal to radio frequency communication means of the RFID reader.

The invention has the advantage that the input capacitance is reduced significantly in contrast to known radio frequency interface circuits for RFID tags. Furthermore, the silicon area required for the circuit according to the invention is smaller than the silicon area necessary for the integration of the known circuits since only a few devices, the variable resistive load in combination with the combiner means fulfill several functions, namely the modulation, voltage regulation and electro static discharge protection. Finally, the rectifier may be designed for smaller currents since the variable resistive load, which causes an electric power reduction, is placed before the rectifier. Thus, the rectifier may be implemented by smaller devices of an integrated circuit which causes less parasitics, particularly capacitances between the device and the substrate.

The invention claimed is:

1. A radio frequency interface circuit for a radio frequency identification tag comprising:
   at least two input terminals for connecting the circuit with an antenna structure of the radio frequency identification tag,
   one or more variable resistive loads coupled across pairs of the input terminals,
   one or more rectifiers each connected on its input side to a pair of input terminals and on its output side to a parallel connection of voltage control means and modulation control means,
   wherein combiner means are provided which are adapted to receive an output signal from the voltage control means and the modulation control means, respectively, and to generate a control signal for controlling each variable resistive load depending on the received signals in such a way that each variable resistive load serves as a modulation and voltage regulation circuit, and
   wherein each variable resistive load is adapted to serve as an electro static discharge protection circuit.

2. A circuit as claimed in claim 1, wherein the combiner means are adapted to detect an over voltage condition from the output signal received from the voltage control means and to generate the control signal such that each variable resistive load is set to a value limiting the input voltage of each rectifier.

3. A circuit as claimed in claim 1, wherein the combiner means are adapted to modulate the control signal in accordance with the output signal received from the modulation control means such that the resistance of each variable resistive load is modulated for transmitting data over the antenna structure of the radio frequency identification tag.

4. A circuit as claimed in claim 1, wherein it is adapted to be operated in the UHF range of about 800 MHz.

5. A circuit as claimed in claim 1, wherein a variable resistive load is a MOSFET, coupled across a pair of input terminals, wherein the control signal is coupled to the gate of the MOSFET.

6. A circuit as claimed in claim 5, wherein the MOSFET is designed to clamp typical electrostatic discharging voltages.

7. An integrated circuit for a frequency identification tag comprising a radio frequency interface circuit as claimed in claim 1.

8. A radio frequency identification tag comprising a radio frequency interface circuit as claimed in claim 1.

* * * * *